US008139566B2

(12) United States Patent
Mills et al.

(10) Patent No.: US 8,139,566 B2
(45) Date of Patent: Mar. 20, 2012

(54) SYSTEM AND METHOD FOR ESTABLISHING A COMMUNICATION SESSION BETWEEN TWO ENDPOINTS THAT DO NOT BOTH SUPPORT SECURE MEDIA

(75) Inventors: David W. Mills, Raleigh, NC (US); Cullen F. Jennings, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 750 days.

(21) Appl. No.: 11/459,193

(22) Filed: Jul. 21, 2006

(65) Prior Publication Data

US 2008/0019381 A1    Jan. 24, 2008

(51) Int. Cl.
*H04L 12/66* (2006.01)
(52) U.S. Cl. ............... 370/356; 370/395.2; 370/401; 709/228; 713/168; 380/257
(58) Field of Classification Search .......... 370/259–261, 370/351–356, 389–390, 400, 401, 395.2; 709/204–205, 227–229; 380/255; 726/4; 713/185, 201, 168; 379/88.22, 88.23; 358/1.15
See application file for complete search history.

(56) References Cited

U.S. PATENT DOCUMENTS

| | | | | |
|---|---|---|---|---|
| 3,963,874 | A | 6/1976 | Pommerening et al. | 179/18 |
| 4,809,321 | A | 2/1989 | Morganstein et al. | 379/211 |
| 6,044,158 | A * | 3/2000 | Terpening et al. | 380/255 |
| 6,501,750 | B1 | 12/2002 | Shaffer et al. | 370/353 |
| 6,510,162 | B1 | 1/2003 | Fijolek et al. | 370/432 |
| 6,546,087 | B2 | 4/2003 | Shaffer et al. | 379/90.01 |
| 6,567,505 | B1 | 5/2003 | Omori et al. | 379/84 |
| 6,601,099 | B1 | 7/2003 | Corneliussen | 709/224 |
| 6,614,899 | B1 | 9/2003 | Sollee et al. | |
| 6,615,236 | B2 | 9/2003 | Donovan et al. | 709/203 |
| 6,625,141 | B1 | 9/2003 | Glitho et al. | 370/352 |
| 6,636,594 | B1 | 10/2003 | Oran | 379/201.01 |
| 6,658,095 | B1 | 12/2003 | Yoakum et al. | 379/93.01 |
| 6,661,799 | B1 | 12/2003 | Molitor | 370/401 |
| 6,665,723 | B2 | 12/2003 | Trossen | 709/227 |

(Continued)

FOREIGN PATENT DOCUMENTS

CN    1722657    8/2004

(Continued)

OTHER PUBLICATIONS

Lindqvist et al., "Privacy management for secure mobility", Workshop on Privacy in the Electronic Society,Proceedings of the 5th ACM workshop on Privacy in electronic society,pp. 63-66, 2006.*

(Continued)

*Primary Examiner* — Jeffrey M Rutkowski
(74) *Attorney, Agent, or Firm* — Baker Botts L.L.P.

(57) ABSTRACT

A method for establishing a communication session between two endpoints that do not both support secure media includes receiving a registration from a first endpoint. The registration indicating the first endpoint supports secure media and non-secure media. The method also includes receiving a registration from a second endpoint. The registration indicating the second endpoint supports non-secure media. The method also includes receiving a request to establish a communication session between the first endpoint and the second endpoint using secure media. The method further includes establishing the communication session between the first endpoint and the second endpoint via the communications platform using non-secure media.

24 Claims, 2 Drawing Sheets

U.S. PATENT DOCUMENTS

| | | | |
|---|---|---|---|
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 | 8/2004 | Foti | 370/261 |
| 6,788,676 B2 | 9/2004 | Partanen et al. | 370/352 |
| 7,149,892 B2 * | 12/2006 | Freed et al. | 709/228 |
| 7,174,534 B2 * | 2/2007 | Chong et al. | 717/105 |
| 7,269,163 B1 * | 9/2007 | Koch et al. | 370/352 |
| 7,372,856 B2 * | 5/2008 | Garg et al. | 370/395.2 |
| 7,418,101 B2 * | 8/2008 | Nobel et al. | 709/229 |
| 7,509,425 B1 * | 3/2009 | Rosenberg | 709/227 |
| 7,570,765 B1 * | 8/2009 | Eslambolchizadeh | 380/257 |
| 7,882,214 B2 * | 2/2011 | Ozaki et al. | 709/228 |
| 2003/0236892 A1 * | 12/2003 | Coulombe | 709/228 |
| 2004/0128538 A1 * | 7/2004 | Gmuender et al. | 713/201 |
| 2004/0196849 A1 * | 10/2004 | Aksu et al. | 370/395.2 |
| 2005/0204148 A1 * | 9/2005 | Mayo et al. | 713/185 |
| 2006/0007484 A1 * | 1/2006 | Tanimoto | 358/1.15 |
| 2006/0007954 A1 | 1/2006 | Agrawal et al. | 370/466 |
| 2006/0010321 A1 * | 1/2006 | Nakamura et al. | 713/168 |
| 2006/0126601 A1 * | 6/2006 | Kim et al. | 370/352 |
| 2006/0130321 A1 | 6/2006 | Kwong et al. | 29/852 |
| 2006/0193259 A1 * | 8/2006 | Sanchez Cembellin et al. | 370/235 |
| 2006/0239247 A1 * | 10/2006 | Postmus | 370/352 |
| 2007/0025341 A1 * | 2/2007 | Baigal et al. | 370/352 |
| 2007/0078986 A1 * | 4/2007 | Ethier et al. | 709/227 |
| 2007/0153777 A1 * | 7/2007 | Coulas et al. | 370/356 |
| 2007/0157026 A1 * | 7/2007 | Zimmermann | 713/171 |
| 2007/0177578 A1 * | 8/2007 | Anspach et al. | 370/352 |
| 2007/0189279 A1 * | 8/2007 | Thalanany et al. | 370/356 |

FOREIGN PATENT DOCUMENTS

| | | |
|---|---|---|
| EP | 1324544 | 12/2001 |
| WO | WO 03/056767 A1 | 7/2003 |

OTHER PUBLICATIONS

Dadoun, "Security Framework for IP Telephony", Polycom, Inc, Feb. 15, 2002, all pages.*

R. Mahy, et al., The Session Initiation Protocol (SIP) "Join Header," The Internet Society, http://www.ietf.org/rfc/rfc3911.txt, pp. 1-15, Oct. 2004.

R. Mahy, et al., "The Session Initiation Protocol (SIP) "Replaces" Header," The Internet Society, http://www.ietf.org/rfc/rfc3891.txt, pp. 1-15, Sep. 2004.

Soroushnejad, "Implementing Bridged Line Appearances (BLA) Using Session Initiation Protocol (SIP)," Yahoo, Inc., http://bgp.potaroo.net/ieff/html/ids/draft-anil-sipping-bla-03.txt, pp. 1-33, Jun. 15, 2006.

Rosenberg et al., "An INVITE Inititiated Dialog Event Package for the Session Initiation Protocol (SIP)," SIP Edge LLC, http://iefreport.isoc.org/idref/draft-ietf-sipping-dialog-package/, pp. 1-38, Apr. 12, 2005.

Schulzrinne et al., "Session Initiation Protocol (SIP)-H.323 Interworking Requirements," The Internet Society, http://www.ietf.org/rfc/rfc4123.txt, pp, 1-15, Jul. 2005.

Rosenberg and et al., "An Offer/Answer Model with the Session Description Protocol (SDP)," The Internet Society, http://www.ietf.org/rfc/rfc3264.txt, pp. 1-24, Jun. 2002.

Rosenberg, et al., Caller Preferences for the "Session Initiation Protocol (SIP)," Tthe Internet Society, http://www.ietf.org/rfc/rfc3841.txt, pp. 1-25, Aug. 2004.

Schulzrinne et al., "RTP Payload of DTMF Digits, Telephony Tones and Telephony Signals," The Internet Society, http://tools.ietf.org/html/rfc2833, pp. 1-27, May 2000.

A.B. Roach, "Session Initiation Protocol (SIP)-Specific Event Notification," The Internet Society, http://www.ietf.org/rfc/rfc3265.txt, pp. 1-34, Jun. 2005.

Mahy et al., "Remote Call Control in the Session Initiation Protocol (SIP) Using the REFER Method and the Session-Oriented Dialog Package," http://www.ietf.org/internet-drafts/draft-mahy-sip-remote-cc-03.txt, pp. 1-14, Mar. 5, 2006.

Mahy et al., Remote Call Control in SIP using the REFER Method and the Session-Oriented Dialog Package, pp. 1-35, Feb. 2004.

Rosenberg et al., "SIP: Session Initiation Protocol ," The Internet Society, RFC 3261, pp. 1-269, Jun. 2002.

PCT Notification of Transmittal of the International Search Report and the Written Opinion of the International Searching Authority, or the Declaration with attached PCT International Search Report and Written Opinion of the International Searching Authority in International Application No. PCT/US07/71339, dated Jul. 31, 2008, 9 pages.

Communication from State Intellectual Property Office of the People's Republic of China regarding Application No. 200780015208.9, Serial No. 2010122200537770, mailed Dec. 27, 2010.

* cited by examiner

SYSTEM AND METHOD FOR ESTABLISHING A COMMUNICATION SESSION BETWEEN TWO ENDPOINTS THAT DO NOT BOTH SUPPORT SECURE MEDIA

TECHNICAL FIELD OF THE INVENTION

This invention relates generally to communications and, more particularly, to a system and method for establishing a communication session between two endpoints that do not both support secure media.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g., Instant Messaging, cellular communications, simple voice sessions, etc.) that exist in the current marketplace.

As new communication technologies become available to the consumer, new protocols need to be developed in order to optimize this emerging technology. One problem that may be encountered occurs when one endpoint requests a communication session, using secure media, with another endpoint that does not support secure media. This often results in the communication session failing to be connected because the two endpoints do not agree on the type of media to use for the call. Furthermore, it may be the case that the call will not fail until after a user of the non-secure endpoint has picked up his handset or otherwise answered the call. Thus, the user of the non-secure endpoint may answer his ringing phone only to hear an error tone (e.g. a tone generated in response to a BYE message).

SUMMARY OF THE INVENTION

From the foregoing, it may be appreciated by those skilled in the art that a need has arisen for a way to establish a communication session where both endpoints may not support secure media. In accordance with an embodiment of the present invention, a method for establishing a communication session between two endpoints includes receiving a registration from a first endpoint. The registration indicating the first endpoint supports secure media and non-secure media. The method also includes receiving a registration from a second endpoint. The registration indicating the second endpoint supports non-secure media. The method also includes receiving a request to establish a communication session between the first endpoint and the second endpoint using secure media. The method further includes establishing the communication session between the first endpoint and the second endpoint via the communications platform using non-secure media.

In some embodiments the secure media may include secure real-time transport protocol and the non-secure media may include real-time transport protocol. Furthermore, in particular embodiments the registration may include a header with a tag indicating that the first endpoint supports receiving a real-time transport protocol answer to a secure real-time transport protocol offer. In some embodiments the tag may include a proprietary fallback element.

In particular embodiments, the request to establish a communication session between the first endpoint and the second endpoint using secure media implies the ability to also establish the communication session between the first endpoint and the second endpoint using non-secure media. In some embodiments the method may also include sending a communication containing identification information to the first endpoint and receiving a communication containing identification information from the first endpoint.

The method may further include alerting the first endpoint that the communication session between the first endpoint and the second endpoint is using non-secure media.

In accordance with another embodiment of the present invention, a system for establishing a communication session between two endpoints that do not both support secure media includes an interface operable to receive, at a communications platform: 1) a registration from a first endpoint where the first endpoint supports secure media and non-secure media; 2) a registration from a second endpoint where the second endpoint supports non-secure media; and 3) a request to establish a communication session between the first endpoint and the second endpoint using secure media. The system also includes a processor coupled to the interface and operable to establish the communication session between the first endpoint and the second endpoint via the communications platform using non-secure media.

Certain embodiments of the present invention may provide a number of technical advantages. For example, according to one embodiment of the present invention, an endpoint that requests a communication session using secure media may indicate that it may also accept a non-secure communication session. Accordingly, the chance that the request for a secure communication session will result in a failed connection is greatly reduced.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF THE INVENTION

Figure 1:
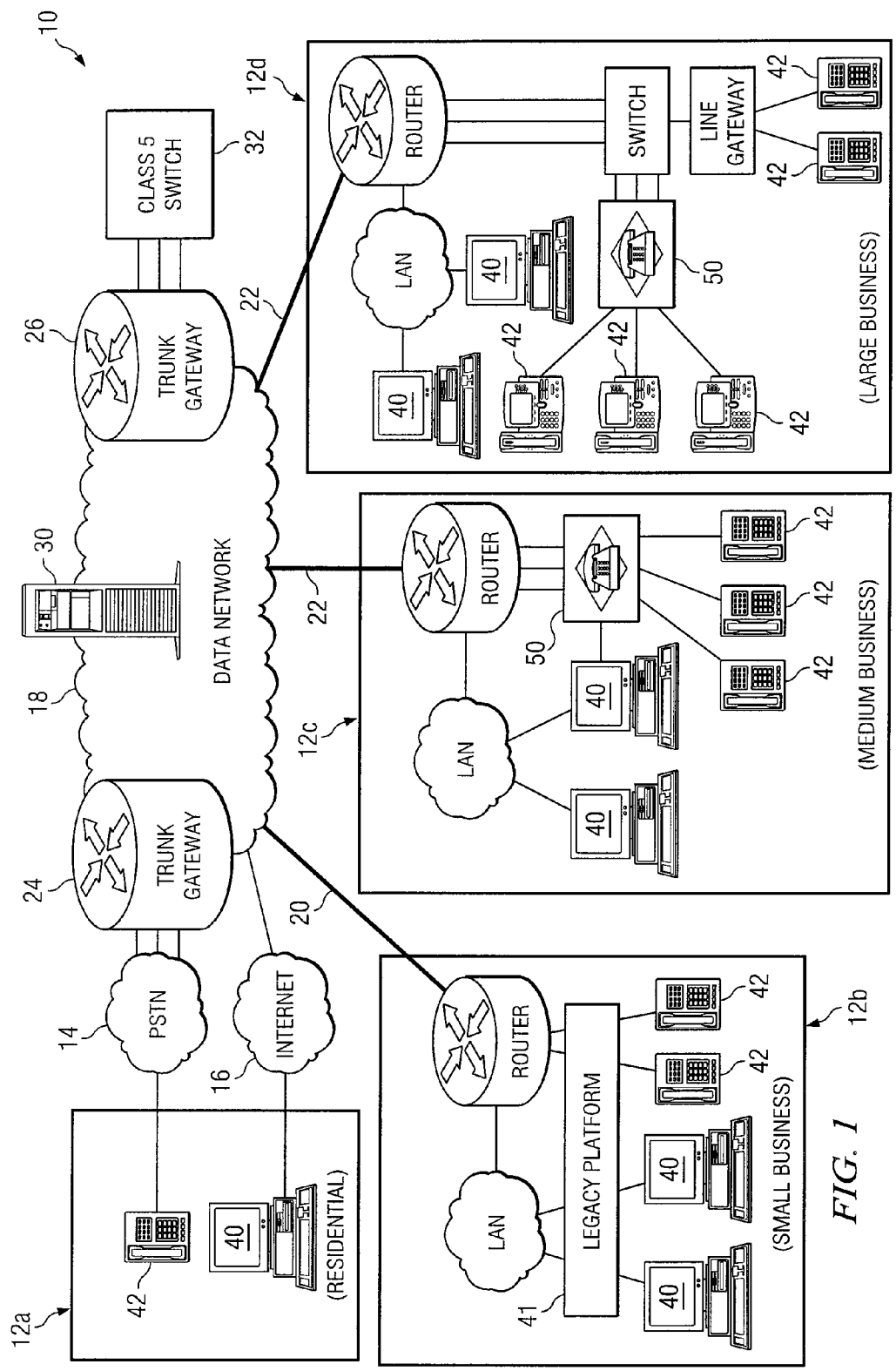
FIG. 1 is a simplified block diagram illustrating a communication system that may include endpoints that do not all support secure media in accordance with one embodiment of the present invention.

FIG. 1 is a simplified block diagram of a communication system 10 for communicating, receiving, and/or transmitting data in a session initiation protocol (SIP) environment. Communication system 10 includes endpoints 12a-12d, public switched telephone network (PSTN) 14, Internet 16, data network 18, broadband access link 20, and a number of additional links 22 (which may include, for example, a digital subscriber line (DSL) link, a T1 link, a fiber optic link, and/or a wireless link). Communication system 10 also includes a set of trunk gateways 24 and 26, a 3rd-party application server 30, and a Class-5 switch 32. In accordance with the teachings of the present invention, the components of FIG. 1 may interact with each other in order to establish a communication session between two endpoints; the first endpoint requesting a communication session with the second endpoint using secure media when the second endpoint does not support secure media. To avoid having the call fail, the communication session may be established via, for example, communications platform 50 using non-secure media. Details related to these operations are provided below. Before turning to those details some preliminary information about the infrastructure of FIG. 1 is provided.

Endpoint 12a represents a residential location, which consists of a computer 40 and a telephone 42. Telephone 42 may be an Internet protocol (IP) telephone or a standard telephone that is operable to interface with computer 40 such that one or more capabilities of SIP are enabled through telephone 42. Accordingly, telephone 42 may be one of two types of telephones. Endpoint 12b represents a small business entity, which consists of a local area network (LAN), a router, legacy platform 41, several computers 40, and several telephones 42. Endpoint 12c represents a medium business entity, which consists of a LAN, a router, a private branch exchange (PBX) or key system (not shown), communications platform 50, several computers 40, and several telephones 42. Endpoint 12d is a large business entity, which consists of a LAN, a router, a switch, a line gateway, communications platform 50, several computers 40, and several telephones 42.

Endpoints 12a-d are SIP-compatible elements that include hardware and/or software that is operable to receive and to transmit data (directly or indirectly). Note that the term "endpoint" encompasses a myriad of potential devices and infrastructure that may benefit from the operations of communication system 10. Endpoints 12a-d may include a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of endpoints 12a-d are malleable and can be readily changed, modified, rearranged, or reconfigured in order to achieve their intended operations. As identified supra, software and/or hardware may reside in endpoints 12a-d in order to achieve the teachings discussed herein. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

There are many applications that require the creation and management of a session, where a session is considered an exchange of data between an association of participants. Furthermore, a communication session shall include the sending or receiving of any type of media transmitted using any audio, video and/or data means through any suitable technology such as voice devices or instant messaging. The term call may be used interchangeably with the term communication session; it is not intended that the use of one or the other implies any different limitations, it is merely a matter of convenience. The implementation of these applications is complicated by the practices of participants: users may move between endpoints, they may be addressable by multiple names, and they may communicate in several different media: in many cases simultaneously. Certain protocols (e.g., SIP, Media Gateway Control Protocol (MGCP) and H.323) have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. In some embodiments communications platforms (e.g., communications platform 50) may be used instead of proxy servers. A communications platform may perform all the same functions as a proxy server as well as some additional functions. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia communication sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location. As part of establishing a communication session, SIP provides for the exchange of messages between endpoints so that all the endpoints (and any intermediary components) are in agreement as to how the communication session is going to be conducted before the endpoints are actually connected and the communication session is established. If the endpoints can not all agree on the same set of parameters the call may fail. An intermediary component, such as communications platform 50, may be able to help the endpoints negotiate how the communication session is going to be conducted.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

Since SIP messages and the sessions they establish can pass through entirely different networks, SIP cannot, and does not, provide any kind of network resource reservation capabilities. Quality of service (QoS) parameters may also be accommodated by SIP (e.g., see RFC 3311).

The nature of the services provided make security particularly important. To that end, SIP provides a suite of security services, which include denial-of-service prevention, authentication (both user to user and proxy to user), integrity protection, and encryption and privacy services. Through SIP, endpoints may establish communication sessions with an added layer of security by using secure media to transport their communications between endpoints. For example, SIP may allow endpoints to communicate using secure real-time transport protocol (SRTP).

Figure 2:
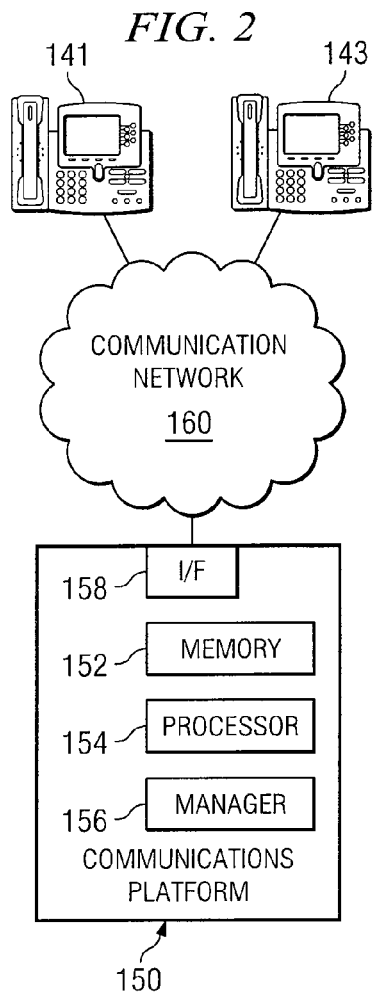
FIG. 2 is a simplified block diagram that illustrates an operation of the communications platform of FIG. 1 in accordance with one embodiment of the present invention.

FIG. 2 is a simplified block diagram that illustrates an operation of the communications platform of FIG. 1. In FIG. 2, communications platform 150 has been depicted in a simplified communications structure. Communications platform 150 is coupled to IP phones 141 and 143 via communications network 160. Communications network 160 may include several separate, but inter-connected communications networks such as any one, or more, of the communications networks discussed above. Through communications network 160 and communications platform 150, IP phones 141 and 143 may be involved in a communication session with each other. A communication session shall include the sending or receiving of any type of media transmitted using any audio, video and/or data means through any suitable technology such as voice devices, audio devices, video devices or instant messaging.

In particular embodiments, communications platform 150 may include, among other components, memory 152, processor 154, and manager 156. Interface 158 couples communications platform 150 with communication network 160 and is operable to receive communications from, and transmit communications to, communication network 160. Processor 154 may be a microprocessor, controller, or any other suitable computing device, resource, or combination of hardware, software and/or encoded logic. Processor 154 may perform secure/non-secure communication protocol interoperability functionality described herein with respect to particular embodiments. Memory module 156 may be any form of volatile or non-volatile memory including, without limitation, magnetic media, optical media, random access memory (RAM), read-only memory (ROM), removable media, or any other suitable local or remote memory component. Memory module 56 may store any suitable information to implement features of various embodiments, such as a database, chart or some other organization of data that associates endpoints with the type of media (secure or non-secure) they support.

In order to better understand particular embodiments of the present invention, the following scenario is set forth. In this scenario assume that IP phone 141 supports both non-secure and secure media, more specifically, that IP phone 141 supports both RTP and SRTP. Further assume that IP phone 143 does not support secure media, such as SRTP, but at least supports non-secure media such as RTP. Finally, assume that IP phones 141 and 143 are both coupled to communications platform 150 such that communications platform 150 may trust both endpoints. Communications platform 150 may trust IP phones 141 and 143 because of an exchange of communications between the devices in which each device identified itself to the other device. It should be noted that this example is merely for illustrative purposes only and illustrates some of the features and workings of a particular embodiment, it is not intended to illustrate all features of all embodiments.

In particular embodiments, in order for either IP phone 141 or 143 to establish a communication session it may first have to register with a Registrar. In FIG. 2, communications platform 150 may be the Registrar, in some embodiments the Registrar may be a proxy server. When an IP phone registers it may notify the Registrar that it supports both secure and non-secure media and that any offers generated by that IP phone for a secure media communication session may also imply an offer for a non-secure communication session, either of which can be chosen via an answer. In some embodiments the IP phone may not notify communications platform 150 of its fallback ability until it attempts to establish a call. The implicit second offer for a non-secure communication session may be treated as a fallback offer, that is, it may only be used if the secure offer is rejected or otherwise fails. For example, IP phone 141 may send a REGISTER message to communications platform 150 that includes a header with a tag specifying that IP phone 141 implicitly supports non-secure media when offering secure media. As alluded to above, IP phone 141 may send information, similar to the information in the header, as part of a message sent during call establishment. Thus, if the communications platform is unable to establish a communication session using secure media then it may fallback to using non-secure media. This message may be received by communications platform 150 through interface 158 and stored within memory 152. It may be apparent that the fallback ability may only be needed when an endpoint is requesting a communication session using secure media. Were the endpoint to receive a request for either secure or non-secure media it would respond that it supports secure or non-secure media, respectively.

Once communications platform 150 has received and stored the REGISTER message, communications platform 150 may send a response to IP phone 141 acknowledging that it received and understood the REGISTER message. In particular embodiments this registration and acknowledgement exchange may use a REGISTER message with X-cisco-srtp-fallback in a header from IP phone 141 and a 200 OK message with X-cisco-srtp-fallback in a header from communications platform 150. In this instance, the exchange lets both communications platform 150 and IP phone 141 know that both devices support falling back to non-secure media. Thus, IP phone 141 may be connected using real-time transport protocol (RTP) or secure RTP (SRTP) depending, in part, on what the other endpoint (e.g., IP phone 143) supports.

By being able to fallback to non-secure media, Manager 156 may increase the likelihood of establishing a communication session with another endpoint. For instance, if IP phone 141 requests a secure communication session, manager 156 knows that if the other endpoint does not support secure media then it can fallback to using non-secure media, rather than failing the call. If either IP phone 141 or communications platform 150 did not support the ability to fallback to non-secure media (e.g., RTP) then when IP phone 141 attempts to establish a communication session with IP phone 143 using secure media the call would fail. However, because of the option to fallback to non-secure media, communications platform 150 is able to connect the two endpoints using non-secure media.

Recall that it has been assumed that IP phone 143 does not support secure media, thus when it registers it would send a standard SIP REGISTER message without a header specifying that it supports secure media or the ability to fallback to non-secure media. Thus, there may not be a fallback ability associated with IP phone 143 and so it may be that IP phone 143 may be able to only use non-secure media.

When IP phone 141 requests a communication sessions with IP phone 143 (e.g., sends an INVITE) it may specify that it wants to use secure media (e.g., the media line of the INVITE may specify SRTP). The request may be sent to communications platform 150 where it may be received via interface 158. Communications platform 150 then sends its own, similar, request to IP phone 143 that contains less information than the request sent by IP phone 141. For example, the request from IP phone 141 may include information pertaining to its capabilities and the media it wants to use for the communication session, while the request that is sent to IP phone 143 may not include that information. More specifically, communications platform 150 may send an INVITE with no SDP, this may be referred to as a delayed offer invite, an invite without offer or delayed media invite. Part of the reason for doing this is that when IP phone 143 receives the request it will respond with its own capabilities. This allows communications platform 150 to know what the capabilities of both endpoints are; and to use that information in establishing a communication session.

Upon receiving the request from communications platform 150, IP phone 143 may respond with a message specifying that it only supports non-secure media. For example, IP phone 143 may send a 200 OK message with RTP in the media line. This message may be received by communications platform 150 via IF 158 and stored in memory 152.

Once communications platform 150 has both the registration (e.g., the REGISTER message) and communication request (e.g., the INVITE message) from IP phone 141 as well as the response (e.g., the 200 OK message) from IP phone 143, manager 156 may then decide the best way to connect the two endpoints. More specifically, because the offer of secure media does not match the non-secure answer the communications platform 150 may not initially be able to connect the two IP phones. However, manager 156 may have accessed memory 152 and found that IP phone 141 had registered with a header indicating that it may fallback to non-secure media (or that IP phone 141 had indicated an ability to fallback to non-secure media during call establishment). Thus, instead of failing the call because IP phone 143's response does not match IP phone 141's request, manager 156 may fallback to using non-secure media to establish the communication session. If communications platform 150 or IP phone 141 did not support the ability to fallback to non-secure media then the call would likely have failed.

While the above scenario dealt with the situation in which the endpoint that supports fallback initiated the call, a similar result, via a slightly different process, may occur where another endpoint attempts to call the endpoint that supports fallback. In this scenario, both IP phone 141 and 143 may go through a registration process similar to the one discussed above. Then IP phone 143 may request a non-secure communication session with IP phone 141. For example, IP phone 143 may send an INVITE with RTP in the media line. As mentioned above, communications platform 150 may not pass this information on to IP 141. Rather, it may send a delayed media invite in which there is no SDP in the INVITE sent to IP phone 141. Thus, it may be that IP phone 141 responds with an offer of SRTP in a 200 OK message sent to communications platform 150. Because IP phone 141 has previously notified communications platform 150 that it supports SRTP fallback to RTP, the communications platform has two alternative offers from IP phone 141, a secure and a non-secure offer. Thus, communications platform 150 is able to connect the two endpoints, even though they offered different media, by using the alternative non-secure media offer received via the fallback ability of one of the endpoints.

In establishing the communication session between IP phones 141 and 143 using non-secure media, communications platform 150 may send IP phone 141, via IF 158, a response containing media information from IP phone 143. More specifically, communications platform 150 may generate and send to IP phone 141 a 200 OK message, with RTP in the media line, that is similar to the message received from IP phone 143. Furthermore, in part because communications platform 150 did not specify the type of media supported by IP phone 141 when it generated the INVITE to IP phone 143, IP phone 143 does not yet know if IP phone 141 supports non-secure media. More specifically, IP phone 143 does not know if IP phone 141 uses RTP (IP phone also does not know that IP phone 141 has requested to use secure media). Thus, communications platform 150 sends an acknowledgement to IP phone 143 that lets IP phone 143 know that the communication session will use non-secure media. For example, the message may be an ACK with SDP containing RTP/AVP in the media line. Similarly, IP phone 141 sends its own acknowledgement to communications platform 150 confirming that it accepts the use of non-secure media. Then once communications platform 150 has received the acknowledgement from IP phone 141 stating that it agrees to use non-secure media, processor 154 (as well as other components both within and without communications platform 150) may be used in the process of establishing the communication session between IP phones 141 and 143 using non-secure media. For example, communications platform 150 may send answers to the endpoints, after which the endpoints may begin sending communications between each other.

Either communications platform 150 or IP phone 141 may, at some point, recognize that while the communication session is being established using non-secure media, IP phone 141 had initially requested secure media. In response to this discrepancy IP phone 141 may display a warning or alert so that a user of IP phone 141 does not mistakenly believe that the communication session is a secure one. For example, the warning may include a light on IP phone 141 that lights up whenever IP phone 141 is involved in a non-secure call.

It should be noted that the configuration of the system of FIG. 2 is malleable and can be readily changed, modified, rearranged, or reconfigured in order to achieve its intended operations or additional operations. Any of the items within FIG. 2 may be combined, where appropriate, or replaced with other functional elements that are operable to achieve any of the operations described herein. For example, IP Phones 141 and 143 may be replaced with PCs running IP telephony software.

Figure 3:
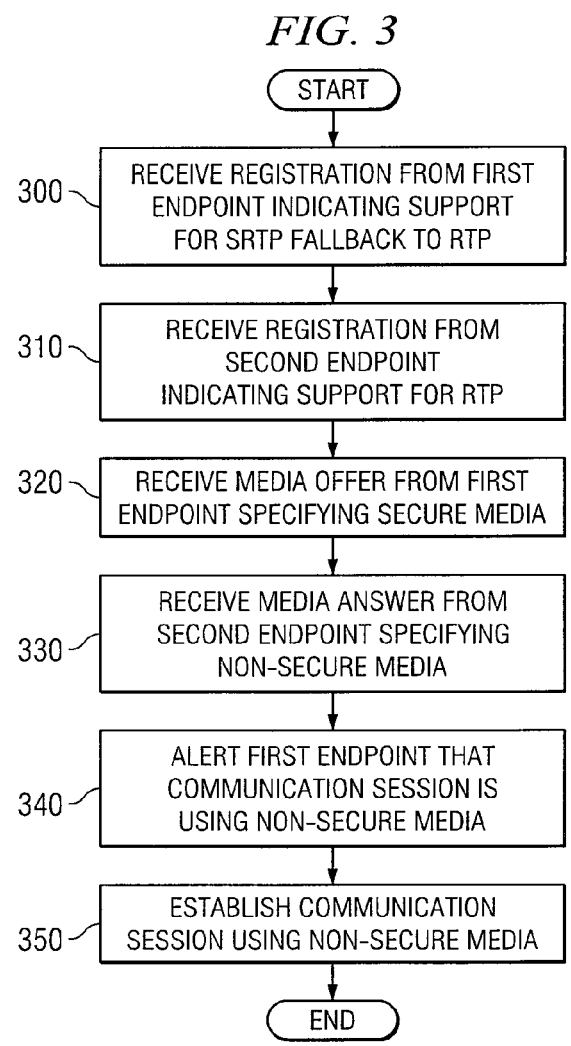
FIG. 3 is a flowchart depicting a method for establishing a communication session between two endpoints that do not both support secure media in accordance with particular embodiments of the present invention.

FIG. 3 illustrates a flowchart depicting a method for establishing a communication session between two endpoints that do not both support secure media in accordance with particular embodiments of the present invention. More specifically, the flowchart of FIG. 3 depicts establishing a communication session using SIP, between a first user that supports both SRTP and RTP and a second user that does not support SRTP. While this flowchart depicts establishing a communication session using SIP and a non-secure media, RTP, it should be noted that the present invention is not limited to the SIP protocol or the RTP form of non-secure media. While this example embodiment uses RTP and SRTP it should be noted that other embodiments may use other secure and non-secure protocols.

The method begins at steps 300 where a communications platform receives a REGISTER message from a first endpoint. The REGISTER message sent in the registration of the first endpoint includes a header that informs the communications platform that if the first endpoint requests a secure communication session using SRTP, it can fallback to using non-secure RTP. One such header may include a proprietary fallback element, such as: "X-cisco-srtp-fallback." The proprietary fallback element may be an element owned by an individual or a corporation, or it may be an element that is not considered standard according to the definition of the protocol used during the registration. As part of the registration process, after the first endpoint sends its REGISTER message, the communications platform may send a 200 OK message that tells the first endpoint, in part, that it supports the first endpoint's RTP fallback capability. It may do so by including a similar "X-cisco-srtp-fallback" line in a header for its 200 OK message. The first endpoint may now be registered with the communications platform. Furthermore, now both the first endpoint and the communications platform may be in agreement that if the communications platform is unable to establish a communication session using SRTP then it may go ahead and use RTP instead of failing to establish the call.

At step 310 the communications platform receives a REGISTER message from a second endpoint as part of the second endpoint's registration. Unlike the first endpoint's registration the second endpoint does not support SRTP fallback to RTP and so its REGISTER message does not include "X-cisco-srtp-fallback" in a header. After receiving the second endpoint's REGISTER message, the communications platform sends a 200 OK message to the second endpoint. This message also does not contain an "X-cisco-srtp-fallback" header since the second endpoint did not indicate SRTP fallback support in its REGISTER request.

While in the depicted embodiment the endpoint that supports SRTP (the first endpoint) registered first this is not a requirement. In practice the SRTP endpoint may register after the RTP endpoint or they may both register at the same time. Furthermore, in some embodiments the endpoint may not inform the communications platform of its fallback ability during registration. Rather, it may include the information in a header of a message sent during call establishment.

Once the first endpoint has registered he may wish to establish a communication session with the second endpoint. This may involve the first endpoint dialing the second endpoint's phone number or extension or otherwise identifying who he wants to communicate with. In attempting to establish the communication session with the identified endpoint the first endpoint may send an INVITE to the communications platform. At step 320 the communications platform receives the first endpoint's media offer. The media offer may be in an INVITE to communicate with the second endpoint. The INVITE may include, among other things, an indication that it wishes to use SRTP as its media; the media line of the INVITE may specify the SRTP media type, for example, Real-Time Protocol, Secure Audio Video Profile (RTP/SAVP). The communications platform uses the information from the INVITE from the first endpoint to generate a delayed media INVITE that is sent to the second endpoint. The delayed media INVITE does not specify the type of media to be used in the communication session.

The second endpoint may respond to the delayed media INVITE with a 200 OK message that specifies it is offering RTP media. This response, which contains a media offer, is received by the communications platform at step 330. Thus, the communications platform now has an offer for a communication session using secure media (SRTP) from the first endpoint and an offer for a communication session using non-secure media (RTP) from the second endpoint. Normally, this would cause the call to fail because the media of the offer does not match the media of the answer. However, in particular embodiments of the present invention, because the first endpoint included "X-cisco-srtp-fallback" in the header when it registered, the communications platform may treat the first endpoint's SRTP offer as two alternative offers; an offer to use SRTP and an alternative offer to use RTP. Thus, the communications platform has two media options from the single INVITE sent by the first endpoint. The communications platform can then match the commonality between the first endpoint's two offered media choices (RTP and SRTP) and the second endpoints single media choice (RTP). Here, RTP is the matching media and so the communications platform may decide to establish the communications session using RTP.

After the communications platform determines the common media, here RTP, it sends a media answer to both endpoints. Each media answer indicates to the respective endpoint that they are to use RTP during the communication session.

At step 340, the first endpoint may be alerted that even though it had requested a communication session using secure media, the established communication session is using non-secure media. This may be done by a specific message sent by the communications platform, or it may be done by the endpoint when it receives an answer from the communications platform with RTP in the media line, indicating that the second endpoint only supports non-secure media. This alert may happen before or concurrently with step 350 which is establishing the communication session between the first and second endpoint.

It is important to note that the stages and steps in FIG. 3 illustrate only some of the possible scenarios that may be executed by, or within, the present system and or method. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. For example, it may be the case that a first endpoint requests a communication session with a non-secure media offer, while a second endpoint responded with an offer of secure media. The call may be completed, despite the differing media offers, because the second endpoint had previously notified the communications platform that it has the ability to fallback to non-secure media if it offers secure media.

The preceding example flow has been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with establishing a communication session between two endpoints in which the first endpoint offers a secure session and the second endpoint only supports non-secure sessions.

Although the present invention has been described in detail with reference to particular embodiments, it should be understood that various other changes, substitutions, and alterations may be made hereto without departing from the spirit and scope of the present invention. The illustrated network architecture of FIGS. 1 and 2 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints 12a-d. Using analogous reasoning, the routers and switches illustrated by FIG. 1 may be supplanted by bridges, gateways, or any other suitable devices that are conducive to network communications. In addition, while the foregoing discussion has focused on SIP, any other suitable session protocol may benefit from the teachings provided herein. The present invention is not confined to the SIP platform.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for establishing a communication session between two endpoints, comprising:
   receiving a first registration from a first endpoint indicating the first endpoint supports secure media and non-secure media;
   receiving a second registration from a second endpoint indicating the second endpoint supports non-secure media;
   receiving a request to establish a communication session between the first endpoint and the second endpoint using secure media; and
   upon receiving the request to establish the communication session between the first endpoint and the second endpoint using secure media, establishing the communication session from the first endpoint to the second endpoint via a communications platform using non-secure media based on the first registration from the first endpoint indicating the first endpoint support non-secure media and the second registration from the second endpoint indicating the second endpoint supports non-secure media.

2. The method of claim 1, wherein:
   the secure media comprises secure real-time transport protocol; and
   the non-secure media comprises real-time transport protocol.

3. The method of claim 1, wherein the first registration from the first endpoint comprises a header with a tag indicating that the first endpoint supports receiving a real-time transport protocol answer to a secure real-time transport protocol offer.

4. The method of claim 3, wherein the tag comprises a proprietary fallback element.

5. The method of claim 1, wherein the request to establish a communication session between the first endpoint and the second endpoint using secure media implies the ability to also establish the communication session between the first endpoint and the second endpoint using non-secure media.

6. The method of claim 1, further comprising alerting the first endpoint that the communication session between the first endpoint and the second endpoint is currently using non-secure media.

7. The method of claim 1, further comprising:
   sending a first communication containing identification information to the first endpoint; and
   receiving a second communication containing identification information from the first endpoint.

8. The method of claim 1, wherein the request to establish the communication session between the first endpoint and the second endpoint using secure media does not contain an explicit indication that non-secure media is supported.

9. The method of claim 1, wherein the registration from the second endpoint indicates the second endpoint does not support secure media.

10. A system for establishing a communication session between two endpoints, comprising:
    an interface configured to:
       receive a first registration from a first endpoint indicating the first endpoint supports secure media and non-secure media;
       receive a second registration from a second endpoint indicating the second endpoint supports non-secure media; and
       receive a request to establish a communication session between the first endpoint and the second endpoint using secure media; and
    a processor coupled to the interface and configured to, upon receiving the request to establish the communication session between the first endpoint and the second endpoint using secure media, establish the communication session from the first endpoint to the second endpoint via communications platform using non-secure media based on the first registration from the first endpoint indicating the first endpoint supports non-secure media and the second registration from the second endpoint indicating the second endpoint supports non-secure media.

11. The system of claim 10, wherein:
    the secure media comprises secure real-time transport protocol; and
    the non-secure media comprises real-time transport protocol.

12. The system of claim 10, wherein the first registration from the first endpoint comprises a header with a tag indicating that the first endpoint supports receiving a real-time transport protocol answer to a secure real-time transport protocol offer.

13. The system of claim 12, wherein the tag comprises a proprietary fallback element.

14. The system of claim 10, wherein the request to establish a communication session between the first endpoint and the second endpoint using secure media implies the ability to also establish the communication session between the first endpoint and the second endpoint using non-secure media.

15. The system of claim 10, wherein the processor is further configured to alert the first endpoint that the communication session between the first endpoint and the second endpoint is using non-secure media.

16. The system of claim 10, wherein the interface is further configured to:
   send a first communication containing identification information to the first endpoint; and
   receive a second communication containing identification information from the first endpoint.

17. A non-transitory computer readable storage medium comprise code, that when executed by a processor is configured to:
   receive a first registration from a first endpoint indicating the first endpoint supports secure media and non-secure media;
   receive a second registration from a second endpoint indicating the second endpoint supports non-secure media;
   receive a request to establish a communication session between the first endpoint and the second endpoint using secure media; and
   upon receiving the request to establish the communication session between the first endpoint and the second endpoint using secure media, establish the communication session from the first endpoint to the second endpoint via a communications platform using non-secure media based on the first registration from the first endpoint indicating the first endpoint supports non-secure media and the second registration from the second endpoint indicating the second endpoint supports non-secure media.

18. The medium of claim 17, wherein:
   the secure media comprises secure real-time transport protocol; and
   the non-secure media comprises real-time transport protocol.

19. The medium of claim 17, wherein the first registration from the first endpoint comprises a header with a tag indicating that the first endpoint supports receiving a real-time transport protocol answer to a secure real-time transport protocol offer.

20. The medium of claim 19, wherein the tag comprises a proprietary fallback element.

21. The medium of claim 17, wherein the request to establish a communication session between the first endpoint and the second endpoint using secure media implies the ability to also establish the communication session between the first endpoint and the second endpoint using non-secure media.

22. The medium of claim 17, wherein the code further comprises code configured to alert the first endpoint that the communication session between the first endpoint and the second endpoint is currently using non-secure media.

23. The medium of claim 17, wherein the code is further configured to:
   send a first communication containing identification information to the first endpoint; and
   receive a second communication containing identification information from the first endpoint.

24. A system for establishing a communication session between two endpoints that do not both support secure media, comprising:
   means for receiving a first registration from a first endpoint indicating the first endpoint supports secure media and non-secure media;
   means for receiving a second registration from a second endpoint indicating the second endpoint supports non-secure media;
   means for receiving a request to establish a communication session between the first endpoint and the second endpoint using secure media; and
   means for upon receiving the request to establish the communication session between the first endpoint and the second endpoint using secure media, establishing the communication session from the first endpoint to the second endpoint via a communications platform using non-secure media based on the first registration from the first endpoint indicating the first endpoint supports non-secure media and the second registration from the second endpoint indicating the second endpoint supports non-secure media.

\* \* \* \* \*